United States Patent
Van Nee

(10) Patent No.: US 9,031,122 B2
(45) Date of Patent: May 12, 2015

(54) REDUCING PHASE ERRORS ON A COMMUNICATION DEVICE

(75) Inventor: Didier Johannes Richard Van Nee, De Meern (NL)

(73) Assignee: QUALCOMM Incorporated, San Diego, CA (US)

( * ) Notice: Subject to any disclaimer, the term of this patent is extended or adjusted under 35 U.S.C. 154(b) by 895 days.

(21) Appl. No.: 13/014,578

(22) Filed: Jan. 26, 2011

(65) Prior Publication Data

US 2011/0188559 A1 Aug. 4, 2011

Related U.S. Application Data

(60) Provisional application No. 61/299,642, filed on Jan. 29, 2010.

(51) Int. Cl.
| H04B 3/46 | (2006.01) |
| H04L 5/00 | (2006.01) |
| H04L 25/02 | (2006.01) |
| H04L 27/26 | (2006.01) |
| H04L 27/00 | (2006.01) |

(52) U.S. Cl.
CPC .......... *H04L 5/0023* (2013.01); *H04L 25/0206* (2013.01); *H04L 25/0212* (2013.01); *H04L 25/0224* (2013.01); *H04L 25/0242* (2013.01); *H04L 27/2607* (2013.01); *H04L 2027/0026* (2013.01)

(58) Field of Classification Search
CPC ..................... H04L 2027/0067; H04L 5/0023; H04L 1/205; H04L 25/0212; H04L 25/0222–25/0224; H04B 7/12; H04W 80/04; H04W 88/022

USPC ........... 375/226, 260, 146; 370/328, 342, 334
See application file for complete search history.

(56) References Cited

U.S. PATENT DOCUMENTS

| 7,310,304 B2 | 12/2007 | Mody et al. |
| 7,822,069 B2 | 10/2010 | Medvedev et al. |

(Continued)

FOREIGN PATENT DOCUMENTS

| JP | 2006514499 A | 4/2006 |
| JP | 3802032 B2 | 7/2006 |

(Continued)

OTHER PUBLICATIONS

Fei Peng et al., "On Residual Carrier Frequency Offset Mitigation for 802.UN", IEEE International Conference on Acoustics, Speech, and Signal Processing Apr. 15-20, 2007 Honolulu, HI, USA, IEEE, Piscataway, NJ, USA, Apr. 15, 2007, pp. III-257, XP031463455, ISBN: 978-1-4244-0727-9.

(Continued)

*Primary Examiner* — Daniel Washburn
*Assistant Examiner* — Fitwi Hailegiorgis
(74) *Attorney, Agent, or Firm* — Eric Ho

(57) ABSTRACT

A communication device that is configured for reducing phase errors is described. The communication device includes a processor and instructions stored in memory. The communication device calculates a sum channel in the frequency domain, estimates one or more impulse responses and isolates an impulse response for one or more wireless communication devices. The communication device also calculates a phase error for each wireless communication device and reduces the phase error for each wireless communication device.

52 Claims, 10 Drawing Sheets

(56) References Cited

U.S. PATENT DOCUMENTS

| | | | |
|---|---|---|---|
| 2005/0195790 A1* | 9/2005 | Learned et al. | 370/342 |
| 2005/0286474 A1* | 12/2005 | van Zelst et al. | 370/334 |
| 2006/0159189 A1* | 7/2006 | Balakrishnan et al. | 375/260 |
| 2007/0104089 A1 | 5/2007 | Mujtaba | |
| 2008/0310484 A1* | 12/2008 | Shattil | 375/146 |
| 2009/0323642 A1 | 12/2009 | Tanno et al. | |
| 2010/0296438 A1* | 11/2010 | Yu et al. | 370/328 |
| 2011/0116562 A1* | 5/2011 | Li et al. | 375/260 |

FOREIGN PATENT DOCUMENTS

| | | |
|---|---|---|
| JP | 2006197132 A | 7/2006 |
| JP | 2009186241 A | 8/2009 |
| JP | 2009239961 A | 10/2009 |
| WO | WO-2004086706 A1 | 10/2004 |
| WO | WO2006018035 | 2/2006 |
| WO | WO-2007137281 | 11/2007 |

OTHER PUBLICATIONS

International Search Report and Written Opinion—PCT/US2011/023005, ISA/EPO—Jul. 11, 2011.

Paul T K, et al., "Wireless LAN Comes of Age: Understanding the IEEE 802.11n Amendment" IEEE Circuits and Systems Magazine, IEEE Service Center, New York, NY, US, vol. 8, No. 1, Jan. 1, 2008, pp. 28-54, XP011205239 ISSN: 1531-636X.

Taiwan Search Report—TW100103693—TIPO—Aug. 16, 2013.

* cited by examiner

REDUCING PHASE ERRORS ON A COMMUNICATION DEVICE

RELATED APPLICATIONS

This application is related to and claims priority from U.S. Provisional Patent Application Ser. No. 61/299,642 filed Jan. 29, 2010, for "CORRECTING PHASE AND FREQUENCY ERRORS FOR UPLINK MU-MIMO ON A COMMUNICATION DEVICE."

TECHNICAL FIELD

The present disclosure relates generally to communication systems. More specifically, the present disclosure relates to reducing phase errors on a communication device.

BACKGROUND

Wireless communication systems are widely deployed to provide various types of communication content such as data, voice, video, and so on. These systems may be multiple-access systems capable of supporting simultaneous communication of multiple wireless communication devices (e.g., access terminals) with one or more communication devices (e.g., access points).

Use of communication devices has dramatically increased over the past few years. These communication devices (e.g., access points) often provide access to a network, such as a Local Area Network (LAN) or the Internet, for example. Multiple wireless communication devices (e.g., access terminals, laptop computers, smart phones, media players, gaming devices, etc.) may simultaneously communicate with communication devices. Some communication devices and wireless communication devices comply with certain industry standards, such as the Institute of Electrical and Electronics Engineers (IEEE) 802.11a, 802.11b, 802.11g or 802.11n (e.g., Wireless Fidelity or "Wi-Fi") standards. Users of wireless communication devices often connect to wireless networks using such communication devices.

When wireless communication devices and communication devices use multiple antennas (in a Multi-User Multiple Input Multiple Output (MU-MIMO) context, for example), particular difficulties may arise. For example, phase offsets (e.g., errors) and frequency offsets (e.g., errors) on the uplink can occur, which may lead to degraded communication performance. For this reason, improved systems and methods that help mitigate phase and/or frequency errors may be beneficial.

SUMMARY

A communication device that is configured for reducing phase errors is disclosed. The communication device includes a processor and executable instructions stored in memory that is in electronic communication with the processor. The communication device calculates a sum channel in the frequency domain. The communication device also estimates one or more impulse responses. Additionally, the communication device isolates an impulse response for one or more wireless communication devices. The communication device further calculates a phase error for each wireless communication device. The communication device also reduces the phase error for each wireless communication device. Reducing the phase and frequency errors for each wireless communication device may be performed using a matrix multiplication. The processor may include a digital signal processor (DSP).

The communication device may also reduce a frequency error for each wireless communication device. The phase and frequency errors for each wireless communication device may be derived by the communication device from phase differences between the one or more impulse responses.

The communication device may be an access point. The communication device may also include multiple antennas. The wireless communication device may be an access terminal.

The communication device may also discover one or more wireless communication devices. The communication device may also receive a plurality of training symbols from each wireless communication device. Each wireless communication device may use at least one spatial stream, and each wireless communication device may use a different cyclic delay per spatial stream.

A cyclic delay difference between each wireless communication device may be greater than an expected channel plus a filtering length. A cyclic delay difference may be large enough to isolate the impulse response for each of the one or more wireless communication devices. The cyclic delay difference may be larger than 200 nanoseconds.

The communication device may also estimate a channel. The communication device may also receive data symbols from the one or more wireless communication devices. The communication device may further demodulate the data symbols using the estimated channel.

A method for reducing phase errors on a communication device is also disclosed. The method includes calculating a sum channel in the frequency domain. The method also includes estimating, on a communication device, one or more impulse responses. Additionally, the method includes isolating, on the communication device, an impulse response for one or more wireless communication devices. The method further includes calculating, on the communication device, a phase error for each wireless communication device. The method also includes reducing, on the communication device, the phase error for each wireless communication device.

A computer-program product for reducing phase errors is also disclosed. The computer-program product includes a non-transitory tangible computer-readable medium with instructions. The instructions include code for causing a communication device to calculate a sum channel in the frequency domain. The instructions further include code for causing the communication device to estimate one or more impulse responses. Additionally, the instructions include code for causing the communication device to isolate an impulse response for one or more wireless communication devices. The instructions further include code for causing the communication device to calculate a phase error for each wireless communication device. The instructions also include code for causing the communication device to reduce the phase error for each wireless communication device.

An apparatus for reducing phase errors is also disclosed. The apparatus includes means for calculating a sum channel in the frequency domain. The apparatus also includes means for estimating one or more impulse responses. Additionally, the apparatus includes means for isolating an impulse response for one or more wireless communication devices. The apparatus further includes means for calculating a phase error for each wireless communication device. The apparatus also includes means for reducing the phase error for each wireless communication device.

DETAILED DESCRIPTION

Figure 1:
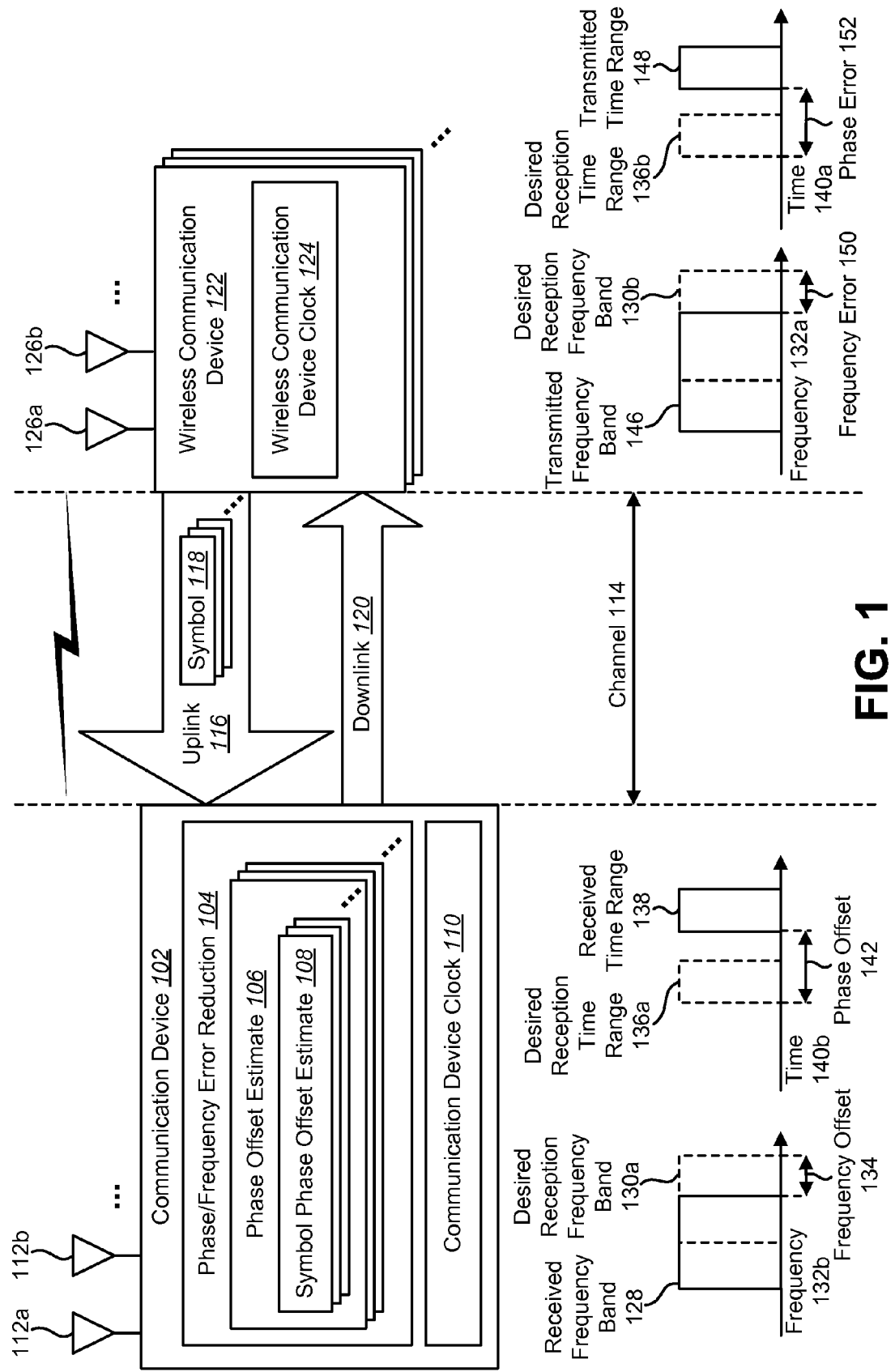
FIG. 1 is a block diagram illustrating one configuration of a communication device in which systems and methods for reducing phase errors on a communication device may be implemented.

In uplink multi-user multiple-input multiple-output (MU-MIMO), estimating a different phase offset and frequency offset on a communication device (e.g., access point) for each wireless communication device (e.g., access terminal) may be beneficial. For instance, the communication device may correct phase and/or frequency offsets on the communication device (as perceived or received by the communication device, for example). This may be particularly beneficial when applied to a wireless communication standard, such as the Institute for Electrical and Electronic Engineers (IEEE) 802.11ac standard. For example, a wireless communication device (e.g., access terminal) may need to synchronize with a communication device. However, residual frequency offsets (e.g., on the order of 1 kHz) may occur. For example, if there is a relative frequency offset and/or drift of more than a few degrees, interference may occur. Moreover, each wireless communication device (e.g., "user" or "client") and/or stream may have different frequency errors and/or phase noise. These frequency and/or phase errors may be resolved individually (without getting interference by other streams, for example) by the communication device. In some configurations, residual frequency offsets are much smaller than subcarrier spacing, such that a communication device may apply correction or reduction techniques in the frequency domain (after a Fast Fourier Transform or FFT, for example) instead of in the time domain.

For instance, to enhance the acceptance of uplink MU-MIMO, it may be desirable for uplink MU-MIMO to use the same preamble as for downlink MU-MIMO. However, one problem that arises with Long Training Symbols (LTS) used for channel estimation is that it may be difficult to estimate and correct for different residual frequency errors or offsets that may be present in an uplink packet.

Estimating phase offsets for each training symbol received may make channel training more robust against phase noise. In one configuration (e.g., Very High Throughput-Long Training Field), channel training has a duration of 8 symbols. If only a residual frequency estimate is available, a linear phase slope across the training interval can be corrected, but any non-linear phase noise changes during the 8 symbols may still cause significant channel estimation errors. The systems and methods disclosed herein may help avoid these estimation errors. In one configuration, the systems and methods disclosed herein make it possible to estimate and reduce or correct phase offsets within an 802.11n-like Walsh encoded Very High Throughput Long Training Field (VHT-LTF) channel training preamble. The phase offsets are caused by different residual frequency offsets and/or different phase noise per wireless communication device (e.g., access terminal or client). One benefit of the systems and methods disclosed herein is that they make uplink MU-MIMO possible using an 802.11n-like channel training, which may be used for downlink MU-MIMO in 802.11ac.

In order to estimate phase errors, a different cyclic delay (e.g., cyclic shift) per uplink wireless communication device (e.g., access terminal) per spatial stream may be used. These different cyclic delays may allow a communication device (e.g., access point) to discriminate between wireless communication devices (e.g., access terminals). More specifically, the different cyclic delays may allow the communication device to estimate a phase offset for each wireless communication device (e.g., "user" or "client") per symbol. In one configuration, the cyclic delay differences are larger than an expected channel plus filtering length. For example, the cyclic delay differences may be larger than a 200 nanoseconds (ns) multiple (per wireless communication device as used by IEEE 802.11n, for example). For example, the cyclic delay differences may be 400 ns or greater between wireless communication devices. The phase and frequency errors per wireless communication device may be derived by a communication device from the phase differences between impulse responses. Phase and frequency errors may then be reduced or corrected (using a matrix multiplication, for example). As used herein, the terms "correct," "correction," "correct for," and other forms of "correct" indicate some level of correction, some reduction of errors or at least some action taken in an effort to reduce errors. That is, correcting phase and frequency offsets or errors may only reduce the phase and frequency offsets or errors. Thus, some amount of phase and frequency offsets or errors may remain after "correction."

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a communication device 102 in which systems and methods for reducing phase errors on a communication device may be implemented. A communication device 102 (e.g., access point) may provide access to a network (e.g., wireless LAN, the Internet or other network). Examples of a communication device 102 include access points, base stations, wireless routers, etc. A communication device 102 may use two or more antennas 112a-b to wirelessly communicate with one or more wireless communication devices (e.g., access terminals) 122. The wireless communication device 122 may also include two or more antennas 126a-b used to communicate with the communication device 102. A wireless communication device 122 may be, for example, an access terminal, desktop computer, laptop computer, smart phone, cell phone, e-book reader, personal digital assistant (PDA), wireless card, netbook, tablet, gaming system, or some other communication device.

One or more signals transmitted across the communication channel 114 from the wireless communication devices 122 that are intended for the communication device 102 may comprise an uplink 116. The uplink 116 may include, for example, one or more carriers, subcarriers and/or spatial streams. Signals transmitted across the communication channel 114 from the communication device 102 to the wireless communication devices 122 may comprise a downlink 120. One or more wireless communication devices 122 may send one or more symbols 118 to the communication device 102 on the uplink 116. The symbols 118 may include or represent data sent by the wireless communication devices 122. Some symbols 118 may be "training symbols" used to discover channel 114 characteristics. These training symbols 118 may be a predetermined sequence of symbols 118 that is "known" on the communication device 102.

Phase offsets 142 (e.g., errors) and/or frequency offsets 134 (e.g., errors) may affect the symbols 118 received by the communication device 102. These phase offsets 142 and/or frequency offsets 134 may be caused by wireless communication device phase errors 152 and/or wireless communication device frequency errors 150. For example, a wireless communication device clock 124 used to generate symbols 118 on the wireless communication device 122 may not be precisely synchronized to a communication device clock 110 on the communication device 102, thereby causing errors 152, 150. The diagrams below the wireless communication device (e.g., access terminal) 122 in FIG. 1 illustrate these errors 152, 150. For example, symbols 118 sent in the transmitted time range 148 may be offset from the desired reception time range 136b by a wireless communication device phase error 152 in time 140a (e.g., neglecting transmission delay). Furthermore, signals (e.g., subcarrier signals) may be sent in a transmitted frequency band 146 that is offset from the desired reception frequency band 130b, causing a wireless communication device frequency error 150 (i.e., illustrated in the frequency 132a domain).

In summary, each wireless communication device 122 (e.g., access terminal or client) may attempt to adjust its transmit frequency to match that of the communication device 102 (e.g., access point). However, this may not be perfectly achieved because of measurement errors and/or phase noise. As a result, each wireless communication device 122 in an uplink packet may have a different frequency and phase noise.

When the symbols 118 are received by the communication device 102, they may be offset in time and/or frequency. The diagrams below the communication device 102 in FIG. 1 illustrate these offsets. That is, as a result of the wireless communication device 122 phase error 152, the symbols 118 may be received in a received time range 138 that is offset in time 140b from the desired reception time range 136a, thereby causing a phase offset 142. Additionally, the wireless communication device 122 frequency error 150 may cause the received frequency band 128 to be offset from the desired reception frequency band 130a, thereby causing a frequency offset 134 (i.e., illustrated on the frequency 132b axis). In one configuration, the desired reception frequency band 130a is a frequency band that the communication device 102 uses to transmit data to the wireless communication device 122. A frequency offset 134, for example, may cause the received frequency band 128 to be offset in the order of 1 kHz from the desired reception frequency band 130a. Furthermore, a phase offset 142 may indicate that the received time range 138 was several degrees out of phase from the desired reception time range 136a.

The communication device 102 may include a phase and/or frequency error reduction module 104. The phase/frequency error reduction module 104 may reduce phase offsets 142 and/or frequency offsets 134 experienced by the communication device 102. One or more phase offset estimates 106 may be included in the phase/frequency error reduction module 104. Each phase offset estimate 106 may correspond to a wireless communication device 122. Each phase offset estimate 106 may further include one or more symbol phase offset estimates 108. In other words, the phase/frequency offset module 106 is capable of estimating a phase offset 142 for each received training symbol 118 from each of the wireless communication devices 122. The symbol phase offset estimates 108 are used to obtain a channel 114 estimation including reductions in phase offsets 142 and/or frequency offsets 134. For example, the communication device 102 may compare the impulse responses per wireless communication device 122. From different symbols, a phase progression may be determined (during the channel portion of the training, for example) to get an estimate of the phase offset 142 per wireless communication device 122 per symbol 118. In other words, the phase offset 142 may cover both residual frequency errors (e.g., a frequency offset 134) and also any random phase noise or drift (e.g., a phase offset 142) during the training symbol 118 transmission. Hence, the symbol phase offset estimates 108 may be used to reduce or correct both phase offsets 142 as well as frequency offsets 134. As illustrated in FIG. 1, the systems and methods disclosed herein may be applied in an uplink Multi-User Multiple-Input Multiple-Output (MU-MIMO) context.

Figure 2:
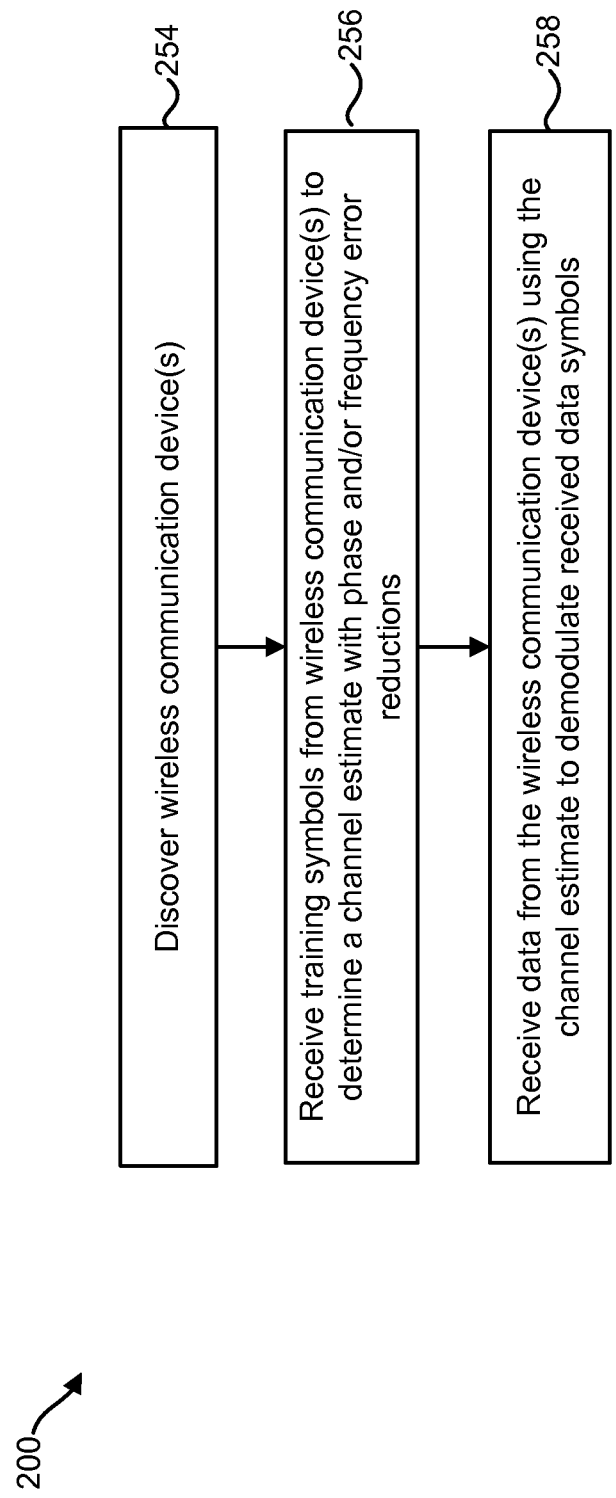
FIG. 2 is a flow diagram illustrating one configuration of a method for reducing phase errors on a communication device.

FIG. 2 is a flow diagram illustrating one configuration of a method 200 for reducing phase errors on a communication device. A communication device (e.g., access point) 102 may discover 254 one or more wireless communication devices (e.g., access terminals) 122. For example, a communication device 102 may receive a message from a wireless communication device 122 requesting access to communication device 102 resources (e.g., a network connection, Internet connection via the communication device 102, etc.). The communication device 102 may receive 256 one or more training symbols 118 from the one or more wireless communication devices 122, which the communication device 102 may use to determine a channel 114 estimate with phase and/or frequency error reductions. The communication device 102 may then receive 258 data from the one or more wireless communication devices 122, using the channel estimate to demodulate received symbols. For example, the one or more wireless communication devices 122 may send "pilot" signals (e.g., symbols) along with the data, which the communication device 102 may use in conjunction with the channel estimate to demodulate received symbols (with reduced phase and/or frequency errors, for example).

Figure 3:
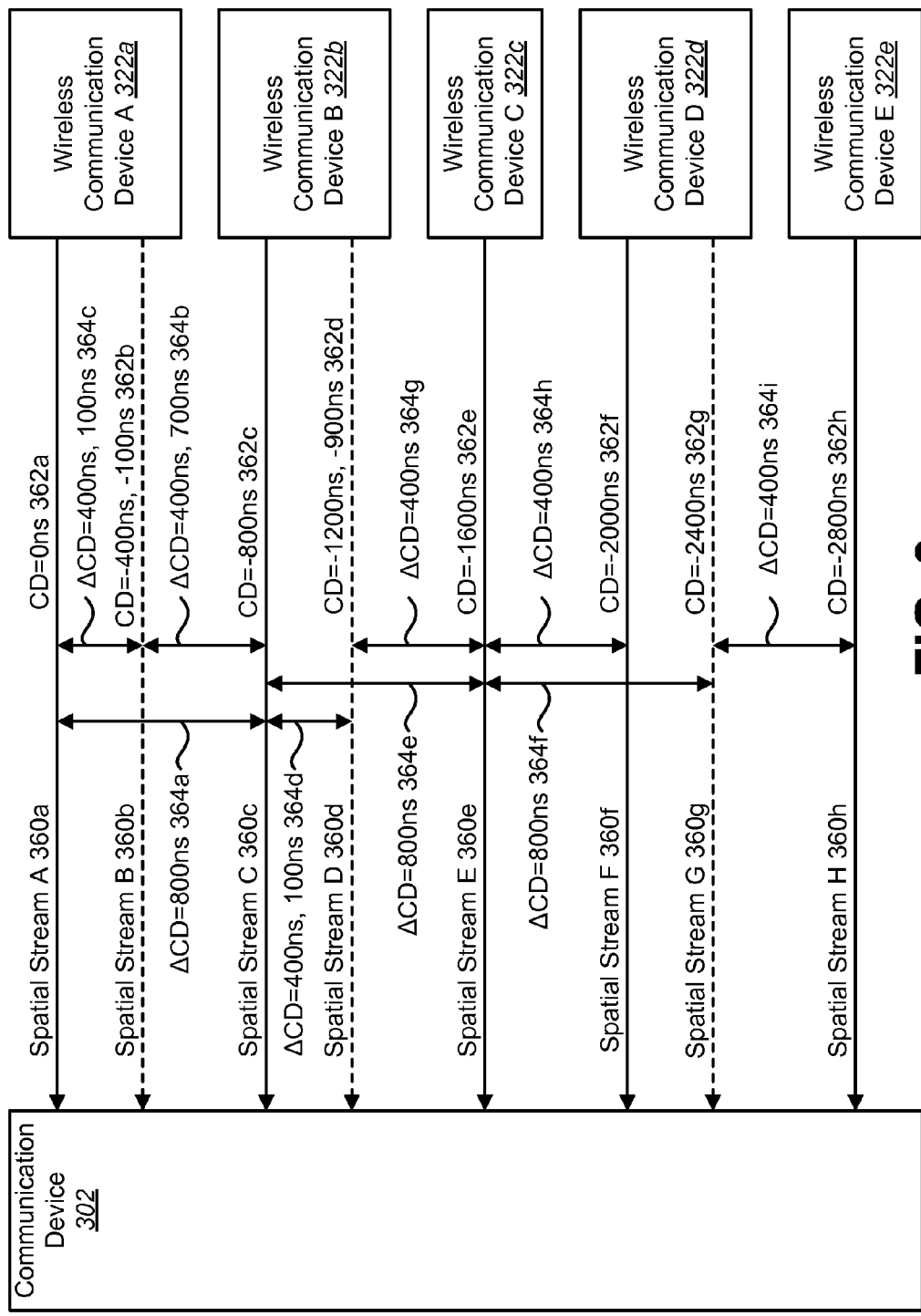
FIG. 3 is a block diagram illustrating examples of spatial streams using cyclic delays according to the systems and methods disclosed herein.

FIG. 3 is a block diagram illustrating examples of spatial streams 360 using cyclic delays 362 according to the systems and methods disclosed herein. In FIG. 3, "cyclic delay" has been abbreviated as "CD" and "cyclic delay difference" has been abbreviated as "ΔCD" for convenience. Several wireless communication devices (e.g., access terminals) 322 may communicate with a communication device 302 using spatial streams 360. A spatial stream 360 may be, for example, a signal transmitted on the uplink 116 with a particular amount of cyclic delay (i.e., "CD" in FIG. 3). The communication device 302 may assign one or more spatial streams 360 to each wireless communication device 322.

In one example, the communication device 302 assigns spatial stream A 360*a* to terminal A 322*a* and spatial stream C 360*c* to terminal B 322*b*. In this example, spatial stream A 360*a* has a 0 ns cyclic delay 362*a*, while spatial stream C 360*c* has a cyclic delay of −800 ns 362*c*, giving rise to a cyclic delay difference (i.e., ΔCD) of 800 ns 364*a*. The cyclic delay difference 364 between spatial streams 360 allows the communication device 302 to discriminate between wireless communication devices 322 (such that a different impulse response per wireless communication device 322 for each training symbol 118 may be estimated by the communication device 302, for example).

The cyclic delay differences 364 between wireless communication devices 322 may be larger than the expected channel plus a filtering length to make it possible to discriminate between wireless communication devices (e.g., access terminals or clients) 322 based on the cyclic delay differences 364. That is, in order to estimate a phase offset 142 between two symbols for a particular wireless communication device 322, it may be beneficial to avoid significant overlap between impulse responses of wireless communication devices 322. For instance, if the impulse responses overlap significantly, there may be interference between wireless communication devices 322. The width of the impulse response may be equal to the channel impulse response length in addition to the length of all filtering. Thus, a cyclic delay difference 364 between wireless communication devices 322 that is larger than the total impulse response length may be beneficial. In the examples illustrated in FIG. 3, cyclic delay differences 364 between wireless communication devices 322 may be greater than 200 ns and may be a multiple of 400 ns or 800 ns.

In another example, the communication device 302 assigns both spatial stream A 360*a* with a cyclic delay of 0 ns 362*a* and spatial stream B 360*b* with a cyclic delay of −400 ns or −100 ns 362*b* to wireless communication device A 322*a*. Furthermore, spatial stream C 360*c* with a cyclic delay of −800 ns 362*c* and spatial stream D 360*d* with a cyclic delay of −1200 ns or −900 ns 362*d* may be assigned to wireless communication device B 322*b* by the communication device 302. This configuration yields a cyclic delay difference of 400 ns or 700 ns 364*b* between spatial stream B 360*b* used by wireless communication device A 322*a* and spatial stream C 360*c* used by wireless communication device B 322*b*. Thus, in one configuration, multiple spatial streams 360 assigned to the same wireless communication device 322 may have a cyclic delay difference 364 of an integer multiple of 400 ns. For example, the cyclic delay difference between spatial stream A 360*a* and spatial stream B 360*b*, which are both assigned to wireless communication device A 322*a* in this example, may be 400 ns 364*c*. Furthermore, the cyclic delay difference between spatial stream C 360*c* and spatial stream D 360*d*, which are both assigned to wireless communication device B 322*b* in this example, may be 400 ns 364*d*.

In another configuration, the cyclic delay difference 364 between spatial streams assigned to the same wireless communication device 322 may be smaller or reduced such that there is more cyclic delay difference between spatial streams assigned to different wireless communication devices 322. For instance, the cyclic delay difference 364*c* between spatial stream A 360*a* and spatial stream B 360*b* used by wireless communication device A 322*a* may be reduced from 400 ns to 100 ns, such that there is a cyclic delay difference of 700 ns 364*b* between spatial stream B 360*b* used by wireless communication device A 322*a* and spatial stream C 360*c* used by wireless communication device B 322*b*. Furthermore, the cyclic delay 364*d* between spatial stream C 360*c* and spatial stream D 360*d*, which are both assigned to wireless communication device B 322*b* in this example, may be reduced to 100 ns 364*d* in order to allow more cyclic delay difference between spatial stream D 360*d* and additional spatial streams used by other wireless communication devices 322. However, in some configurations, this approach may not work when there are more than four wireless communication devices 122 with one spatial stream 360 each.

Many other configurations may be used. For example, for up to four wireless communication devices 322, only spatial stream A 360*a*, spatial stream C 360*c*, spatial stream E 360*e* and spatial stream G 360*g* may be respectively used by wireless communication device A 322*a*, wireless communication device B 322*b*, wireless communication device C 322*c* and wireless communication device D 322*d*. In this way, there are 800 ns cyclic delay differences 364*a*, 364*e*, 364*f* between spatial stream A 360*a*, spatial stream C 360*c*, spatial stream E 360*e* and spatial stream G 360*g* used by wireless communication devices A, B, C and D 322*a*, 322*b*, 322*c*, 322*d*.

In another example, wireless communication device A 322*a* is assigned spatial streams A 360*a* and B 360*b*, wireless communication device B 322*b* is assigned spatial streams C 360*c* and D 360*d*, wireless communication device C 322*c* is assigned spatial stream E 360*e*, wireless communication device D 322*d* is assigned spatial streams F 360*f* and G 360*g*, and wireless communication device E 322*e* is assigned spatial stream H 360*h*. In this example, spatial stream A 360*a* has a cyclic delay of 0 ns 362*a*, spatial stream B 360*b* has a cyclic delay of −400 ns 362*b*, spatial stream C 360*c* has a cyclic delay of −800 ns 362*c*, spatial stream D 360*d* has a cyclic delay of −1200 ns 362*d*, spatial stream E 360*e* has a cyclic delay of −1600 ns 362*e*, spatial stream F 360*f* has a cyclic delay of −2000 ns 362*f*, spatial stream G 360*g* has a cyclic delay of −2400 ns 362*g* and spatial stream H 360*h* has a cyclic delay of −2800 ns 362*h*. Thus, the cyclic delay difference between spatial streams 360 used by each of wireless communication devices 322 is 400 ns. For example, respective cyclic delay differences 364*b*, 364*g*, 364*h*, 364*i* between wireless communication devices A 322*a* and B 322*b*, B 322*b* and C 322*c*, C 322*c* and D 322*d* and D 322*d* and E 322*e* are 400 ns.

Figure 4:
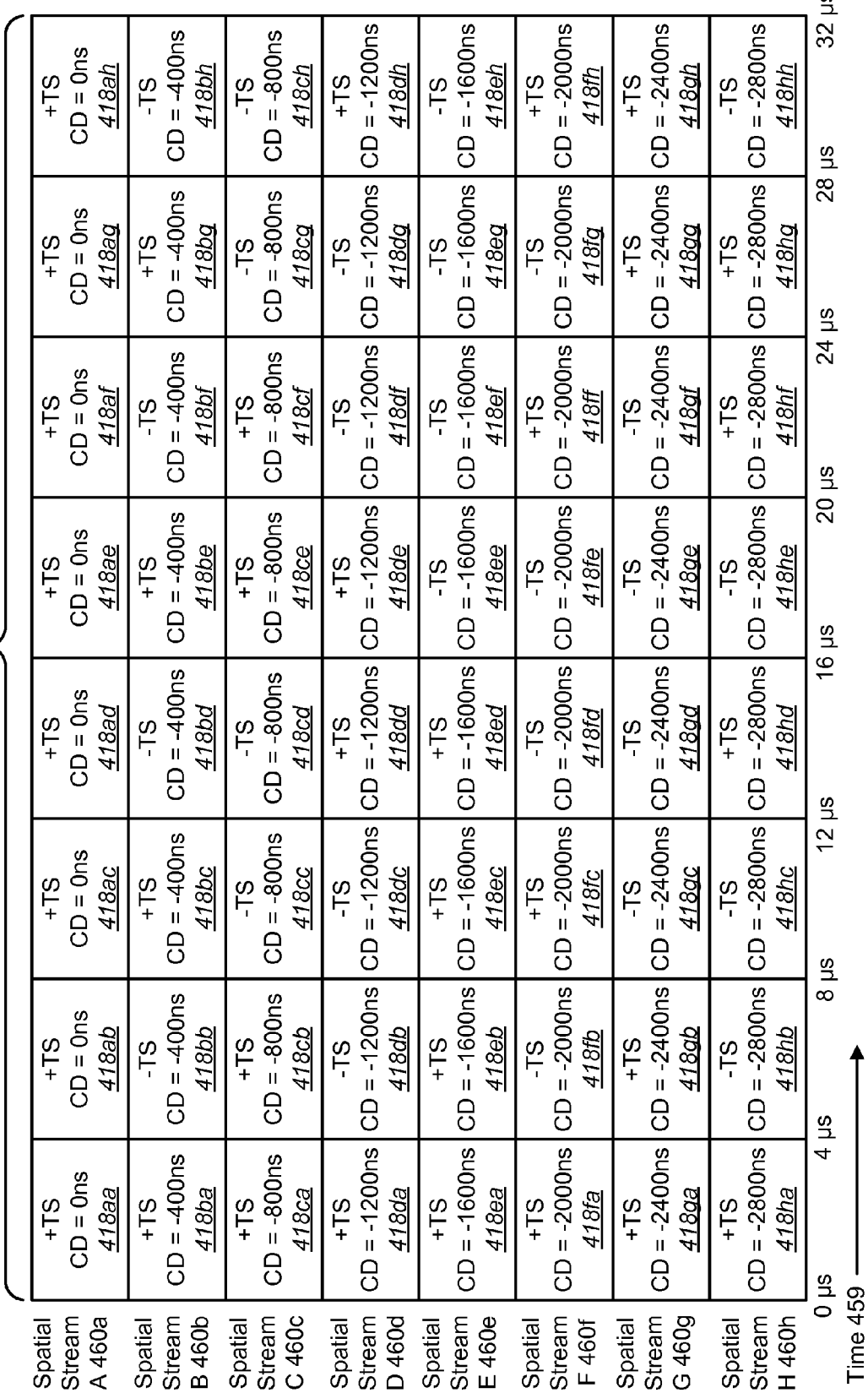
FIG. 4 is a diagram illustrating an example of one configuration of several training symbols included in several spatial streams with varying cyclic delays.

FIG. 4 is a diagram illustrating an example of one configuration of several training symbols included in several spatial streams with varying cyclic delays. In FIG. 4, training symbol has been abbreviated as "TS" and cyclic delay has been abbreviated as "CD" for convenience. Each of the spatial streams 460*a*-*h* may include several training symbols 418. The training symbols 418 may be sent in a preamble 466 of a message from the wireless communication devices 122 to the communication device 102. For example, the training symbols 418 may be Very High Throughput-Long Training Field (VHT-LTF) symbols.

In the example shown in FIG. 4, each training symbol 418 occupies 4 microseconds (μs) in time 459. Furthermore, each of the training symbols 418 is sent with a cyclic delay according to the cyclic delay of a corresponding spatial stream 460. For example, the training symbols 418*aa*-*ah* on spatial stream A 460*a* are sent with a cyclic delay of 0 ns. Furthermore, the training symbols 418*ba*-418*bh* on spatial stream B 460*b* are sent with a cyclic delay of −400 ns, the training symbols 418*ca*-*ch* on spatial stream C 460*c* are sent with a cyclic delay of −800 ns, the training symbols 418*da*-*dh* on spatial stream D 460*d* are sent with a cyclic delay of −1200 ns, the training symbols 418ea-eh on spatial stream E 460e are sent with a cyclic delay of −1600 ns, the training symbols 418fa-fh on spatial stream F 460f are sent with a cyclic delay of −2000 ns, the training symbols 418ga-gh on spatial stream G 460g are sent with a cyclic delay of −2400 ns and the training symbols 418ha-hh on spatial stream H 460h are sent with a cyclic delay of −2800 ns.

It can also be observed in the example in FIG. 4 that the training symbols 418aa-hh on the spatial streams 460a-h may form a Walsh-Hadamard code, which makes each spatial stream 460 orthogonal to other spatial streams 460. This pattern may be modified as long as the 8×8 matrix remains orthogonal. For example, matrix rows may be switched and/or columns may be multiplied by −1. Furthermore, it is possible to make the training symbol pattern (e.g., VHT-LTF pattern) such that the pattern of the first four spatial streams (i.e., spatial streams A 460a, B 460b, C 460c and D 460d) and the first four symbols 418aa-dd is equal to the IEEE 802.11n P matrix. To accomplish this, the 8×8 P matrix may be constructed as shown in Equation (1) below:

$$\begin{bmatrix} P & P \\ P & -P \end{bmatrix} \quad (1)$$

In one configuration, the P matrix contains the constellation values for all VHT-LTF symbols and all spatial streams. For instance, stream five of VHT-LTF symbol number two uses the constellation value in row two and column five of the P matrix.

Figure 5:
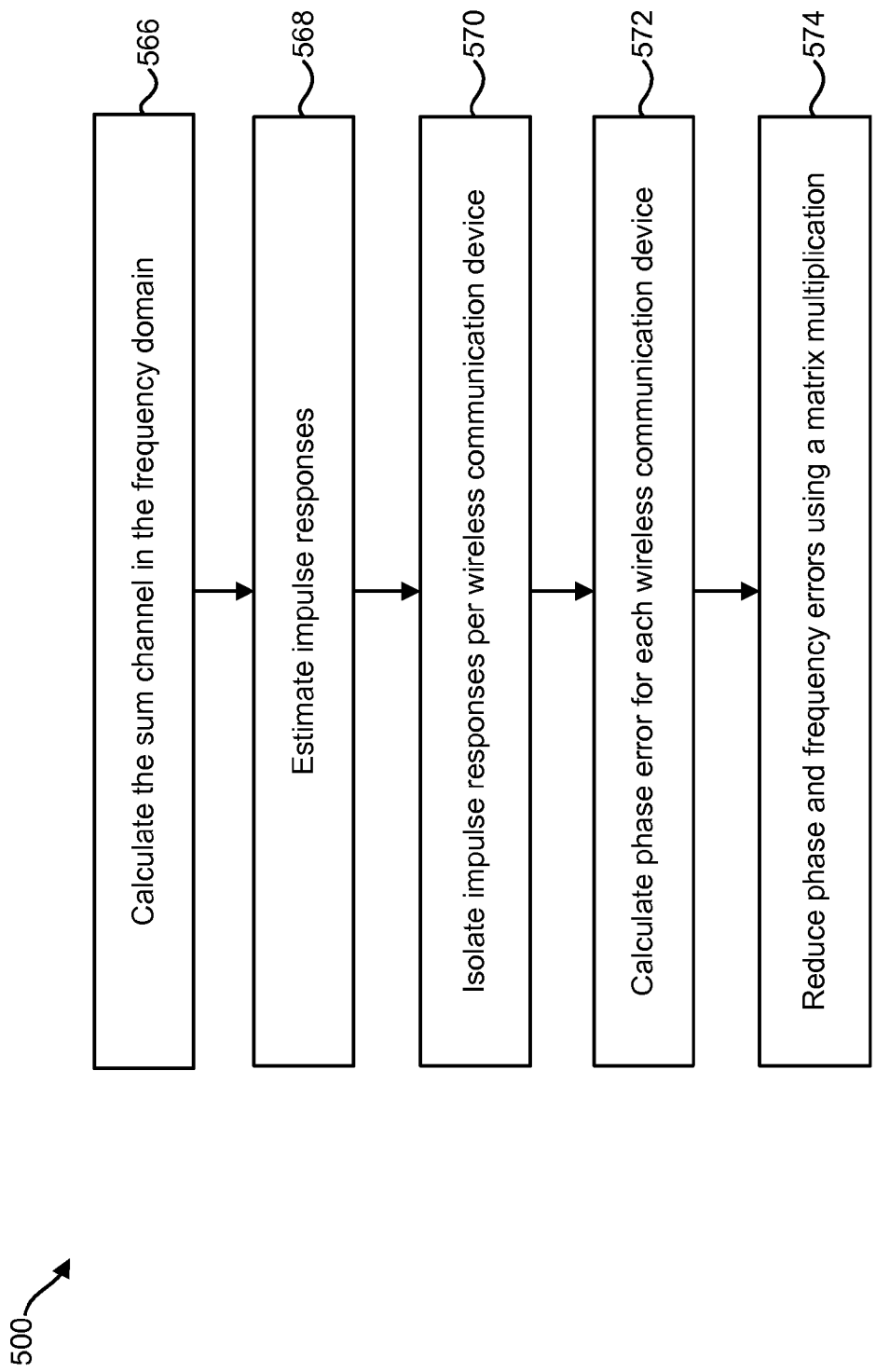
FIG. 5 is a flow diagram illustrating one configuration of a method for reducing phase errors on a communication device.

FIG. 5 is a flow diagram illustrating one configuration of a method 500 for reducing phase errors on a communication device. A communication device (e.g., access point) 102 may calculate 566 a sum channel in the frequency domain. For example, the communication device 102 may take a Fast Fourier Transform (FFT) of the received symbols 118 and multiply it by a known data pattern, yielding the sum channel.

The communication device 102 may estimate 568 the impulse responses for each received symbol 118. In one configuration, the communication device 102 takes an Inverse Fast Fourier Transform (IFFT) of the product of the sum channel and a windowing function (to yield impulse response estimates, for example). The windowing function may be used to remove the Gibbs phenomenon, for example. For instance, the windowing function may be a raised cosine window (e.g., for a 40 MHz channel) with roll-off length intervals of 24 samples. Larger or smaller roll-off values are possible. Larger roll-off values may reduce the added impulse response length. In one configuration, however, a length of 24 samples is already close to a maximum possible length of 28. For an 80 MHz channel, the same roll-off length may be used, but more ones are needed to cover more tones. For a 20 MHz channel, a maximum roll-off of 14 samples can be used since there are only 28 tones to the left and right of the unused direct current (DC) tone.

The window examples discussed are simple real-valued raised cosine windows. A real window in the frequency domain translates to a symmetric impulse response in the time domain. Received channel impulse responses may be convolved with the window response. However, to minimize the extra response length added by the real window, a complex valued window may be used that has an asymmetric impulse response. In one configuration, the cyclic impulse response may be viewed as the magnitude of the Inverse Fast Fourier Transform of the window (e.g., |IFFT(window)|). For example, the impulse response may be normalized to a sum power of 1 and the total power in taps 10 to 128 may be −51 decibels relative to the carrier (dBc). That is, there may be only 9 significant taps, giving a span of 200 ns for a 40 megahertz (MHz) sampling rate. The worst case tap outside of the first 9 taps may be about −65 dBc.

The communication device 102 may isolate 570 the impulse responses per wireless communication device (e.g., access terminal) 122 for each received symbol. For example, the communication device 102 may separate a range of samples corresponding to the impulse response of each wireless communication device 122 for each received symbol. Using the isolated impulse response, the communication device 102 may calculate 572 a phase error (e.g., angle) for each wireless communication device 122. The communication device 102 may then reduce 574 the phase and/or frequency errors (e.g., using a matrix multiplication). In other words, the communication device 102 may use the calculated phase errors to calculate a channel 114 estimate including phase and/or frequency error reductions or corrections that may be used to reduce or correct phase and/or frequency errors.

Figure 6:
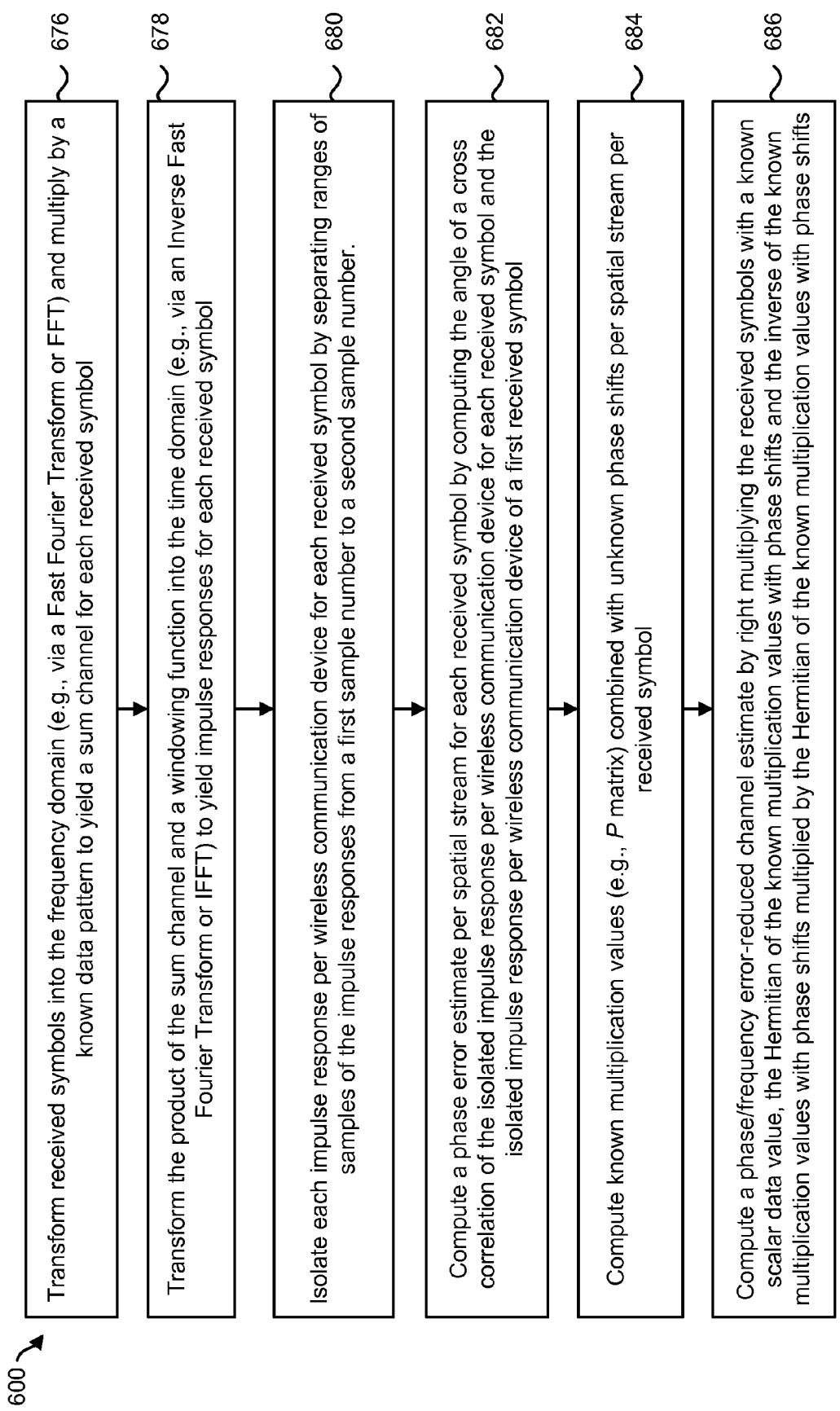
FIG. 6 is a flow diagram illustrating a more specific configuration of a method for reducing phase errors on a communication device.

FIG. 6 is a flow diagram illustrating a more specific configuration of a method 600 for reducing phase errors on a communication device. That is, FIG. 6 gives more detail regarding one possible implementation of the method 500 as shown in FIG. 5 for reducing phase errors on a communication device.

A communication device (e.g., access point) 102 may transform 676 received symbols 118 into the frequency domain (e.g., via an FFT) and multiply the transformed received symbols by a known data pattern to yield a sum channel for each received symbol 118. This procedure may be illustrated by Equation (2).

$$H_n(f) = \text{FFT}(r_n)L(f) \quad (2)$$

In Equation (2), $H_n(f)$ is the sum channel for subcarrier f in the frequency domain, FFT( ) is a Fast Fourier Transform (FFT) operation, $r_n$ is a received training symbol 118 with symbol number n and L(f) is a known training symbol 118 data pattern.

The communication device 102 may then transform 678 the product of the sum channel and a windowing function into the time domain (e.g., via an IFFT) to yield estimated impulse responses for each received symbol 118. This may be computed as illustrated in Equation (3).

$$h_n = \text{IFFT}\{H_n(f)W(f)\} \quad (3)$$

In Equation (3), $h_n$ represents the impulse responses for the wireless communication devices 122 for each received symbol 118, IFFT{ } is an N-Point Inverse Fast Fourier Transform (IFFT) operation and W(f) is a windowing function with a roll-off at the band-edges and around direct current (DC) (e.g., as was described in connection with FIG. 5 above). Because there is a cyclic delay between wireless communication devices 122, for example, the sum of the impulse responses may include separate (e.g., isolated) different impulse responses on different delays in the $h_n$ estimate.

The communication device 102 may then isolate 680 each impulse response per wireless communication device 122 for each received symbol 118 by separating ranges of samples of the impulse responses, where a range of samples for one wireless communication device 122 is from a first sample number to a second sample number. The first sample number may be the computed remainder of a cyclic delay (e.g., in number of samples) of the wireless communication device 122 minus a number of impulse response samples on a negative side plus a number of points (e.g., used for an N-point FFT or IFFT) divided by the number of points. The second sample number may be the computed remainder of a cyclic delay (e.g., in number of samples) of the wireless communication device 122 plus a number of impulse response samples on a positive side plus a number of points (e.g., used for an N-point FFT or IFFT) divided by the number of points. Isolating 680 each impulse response per wireless communication device 122 for each received symbol 118 may be performed as illustrated in Equation (4).

$$h_{cn} = h_n((d_c - T_- + N)\%N : (d_c + T_+ + N)\%N) \quad (4)$$

In Equation (4), $h_{cn}$ represents the isolated impulse response per wireless communication device 122 for each received symbol 118 (i.e., with symbol number n), c is the wireless communication device 122 number (e.g., "client" number), $d_c$ is the cyclic delay 362 in samples for wireless communication device 122 c, $T_-$ is the number of impulse response samples on the negative side, $T_+$ is the number of impulse response samples on the positive side, % is the modulo operator and N is the number of points used for an N-point FFT or IFFT. Thus, the impulse response per wireless communication device 122 for each received symbol 118 is isolated by taking a range of samples from the first sample number to the second sample number of the impulse responses for each received symbol 118. It should be noted that if a wireless communication device 122 has more than one spatial stream 360, $T_-$ and $T_+$ may be chosen such that $h_{cn}$ spans the impulse responses of all of the wireless communication device's 122 spatial streams 360 or a part of all of its spatial streams 360, assuming that the streams 360 have adjacent cyclic delay 362 values, for example.

The communication device 102 may compute 682 a phase error estimate (e.g., angle) per spatial stream 360 (wireless communication devices 122 may be assigned one or more spatial streams 360 as discussed in connection with FIG. 3 above, for example) for each received symbol 118 by computing the angle of a cross correlation (e.g., from 0 to the sum of impulse response samples on the negative and positive sides) of the isolated impulse response per wireless communication device 122 for each received symbol 118 and the isolated impulse response per wireless communication device 122 of a first received symbol (e.g., "symbol 0"). The phase error estimate may be computed as illustrated in Equation (5).

$$\varphi_{cn} = \text{angle}\left(\sum_{k=0}^{T_-+T_+} h_{cn}(k) h_{c0}(k)^*\right) \quad (5)$$

In Equation 5, $\phi_{cn}$ is the phase error estimate per wireless communication device 122 for each received symbol 118. For example, Equation 5 may illustrate differential detections of an impulse response of a symbol with the impulse response of the first symbol. For instance, the impulse response of wireless communication device 122 c for symbol n (e.g., $h_{cn}$) is multiplied with a complex conjugated channel impulse response of the same wireless communication device 112 c of the first symbol 0. Then this number may be summed across all of the relevant samples (e.g., over the interval that is relevant for wireless communication device 122 c). The angle of this measurement $\phi_{cn}$ may represent the phase drift from symbol 0 to symbol n, which may be caused by any phase noise (e.g., error) and/or frequency error (which may be beneficially reduced or corrected). The communication device 102 may use this approach for each wireless communication device 122 and each symbol 118.

The communication device 102 may compute 684 known multiplication values combined with unknown phase shifts per spatial stream per received symbol 118. The signal received on the communication device 102 may be written as $L_f H_f R$. $L_f$ is a scalar value containing a known training data value of subcarrier f. $H_f$ is the channel matrix at subcarrier f with dimensions of the total number of spatial streams summed across all uplink wireless communication devices 122 (e.g., "clients") by the number of communication device 102 receive antennas 112. R is a matrix comprising the known (e.g., $\{1, -1\}$) multiplication values of $P_{mn}$ per spatial stream m per symbol n, combined with unknown phase shifts per spatial stream per symbol $\phi_{mn}$. This computation may be carried out as illustrated in Equation (6).

$$R_{mn} = P_{mn} \exp(j\phi_{mn}) \quad (6)$$

The communication device 102 may compute 686 a channel estimate with phase and/or frequency error reduction by right multiplying the received symbols 118 with a known scalar data value (e.g., for a subcarrier), the Hermitian of the known multiplication values with phase shifts (e.g., $R_{mn}$) and the inverse of the known multiplication values with phase shifts multiplied by the Hermitian of the known multiplication values with phase shifts. The channel estimate may be computed 686 as illustrated in Equation (7).

$$L_f H_f R * L_f R^H (RR^H)^{-1} = H_f RR^H (RR^H)^{-1} = H_f \quad (7)$$

In Equation (7), $L_f$ is a known training symbol scalar data value at subcarrier f, $H_f$ is the channel estimate at subcarrier f (i.e., where the dimensions of $H_f$ are the total number of spatial streams 360 summed across all uplink wireless communication devices 122 by the number of communication device 102 receive antennas 112), R is the known multiplication values (e.g., $P_{mn}$) with phase shifts and $R^H$ is the Hermitian of R. Expected phase errors may be small (e.g., much smaller than $\pi$) such that $RR^H$ may be close to a unitary matrix, which may guarantee good invertibility.

It should be noted that with different phase errors per wireless communication device 122 for each training symbol 118, $L_f H_f R$ represents the received signal at subcarrier f and training symbol n 118. It should also be noted that there is a cyclic delay dependent phase shift per subcarrier in the received signal. Since it may be assumed that this cyclic shift is the same for training symbols 118 and data symbols, it may be viewed as part of the channel estimate $H_f$ so there may be no need to remove the cyclic delay contribution from the actual channel.

One possible configuration of the method 600 may be implemented with the following computational costs: one IFFT per training symbol per receive antenna 112, one multiply per subcarrier for windowing, a cross-correlation between symbols (i.e., requiring N multiplies and additions), one angle computation per training symbol 118 per wireless communication device 122, the matrix inversion of $RR^H$ and a matrix multiplication of training symbol frequency domain samples by $L_f R^H (R^H R)^{-1}$.

Figure 7:
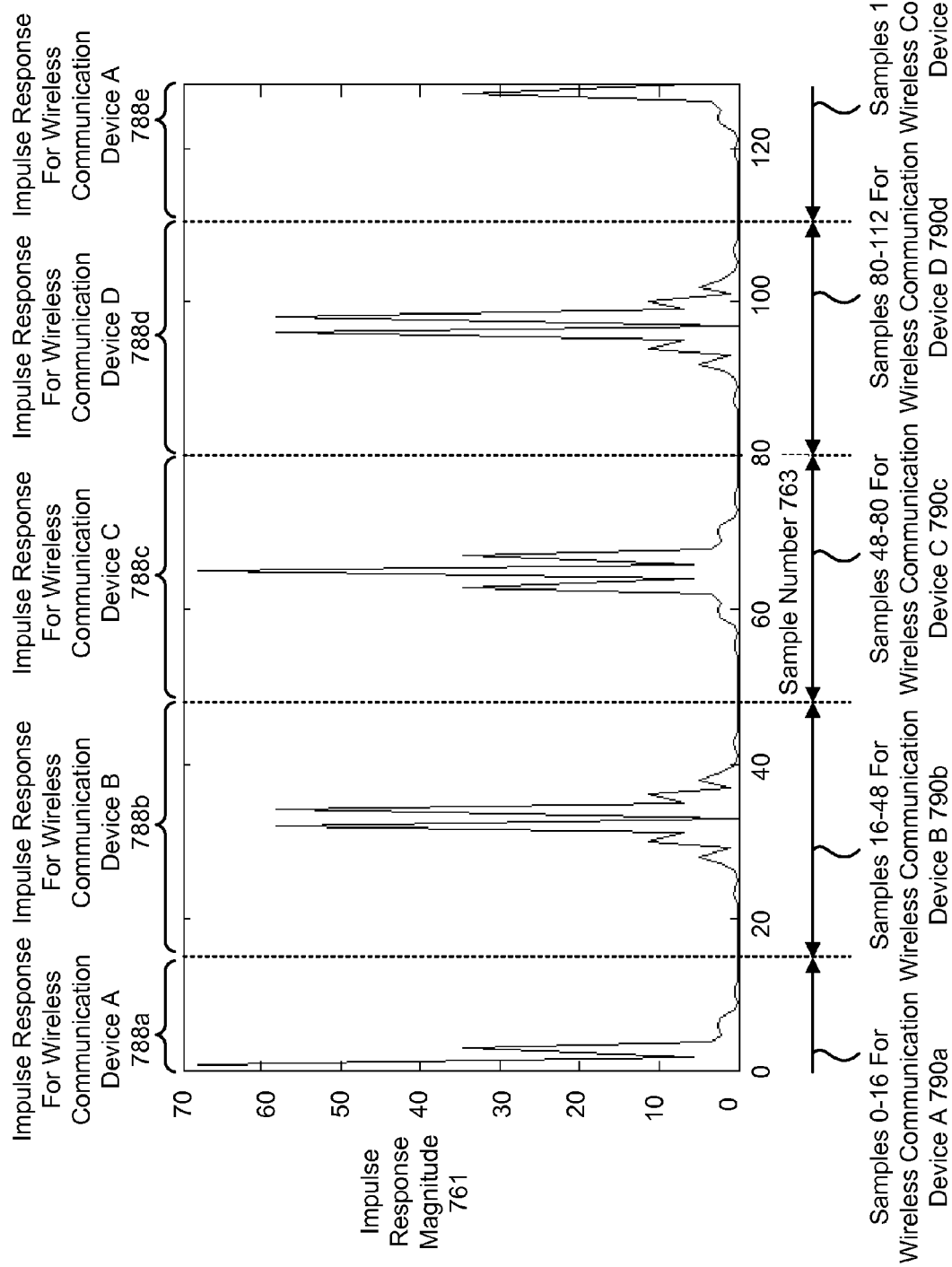
FIG. 7 is a graph illustrating one example of isolating impulse responses for several wireless communication devices.

FIG. 7 is a graph illustrating one example of isolating impulse responses for several wireless communication devices. This graph shows an example of impulse response magnitude (e.g., $|h_n|$) 761 for four wireless communication devices 122 (e.g., access terminals) in one training symbol 118, using a unitary 4×4 channel consisting of an FFT matrix (according to sample number 763). In FIG. 7, the x-axis illustrates the sample number 763, where a sample interval is 1/40e6 seconds. The y-axis illustrates magnitude 761 of the impulse response with an arbitrary scaling factor. For example, FIG. 7 illustrates a windowed IFFT output showing impulse responses of uplink wireless communication devices 122 separated by a cyclic delay difference. In this example, $T_-=T_+=16$ samples. The impulse response (i.e., magnitude) for wireless communication device A 788a, 788e (i.e., with a cyclic delay of 0) can be observed in two sample number ranges: from samples 112-127 and samples 0-16. The impulse response for wireless communication device B 788b is illustrated in samples 16-48, the impulse response for wireless communication device C 788c is illustrated in samples 48-80 and the impulse response for wireless communication device D 788d is illustrated in samples 80-112. Each of these impulse responses may be isolated 570 according to Equation (4) above. For example, samples 112-127 790e and samples 0-16 790a may be isolated 570 for wireless communication device A 788a. Furthermore, samples 16-48 790b may be isolated 570 for wireless communication device B 788b, samples 48-80 790c may be isolated 570 for wireless communication device C 788c and samples 80-112 790d may be isolated 570 for wireless communication device D 788d. Thus, FIG. 7 illustrates that impulse responses from several wireless communication devices 122 may be isolated by a communication device 102 as a result of having different cyclic delays.

Figure 8:
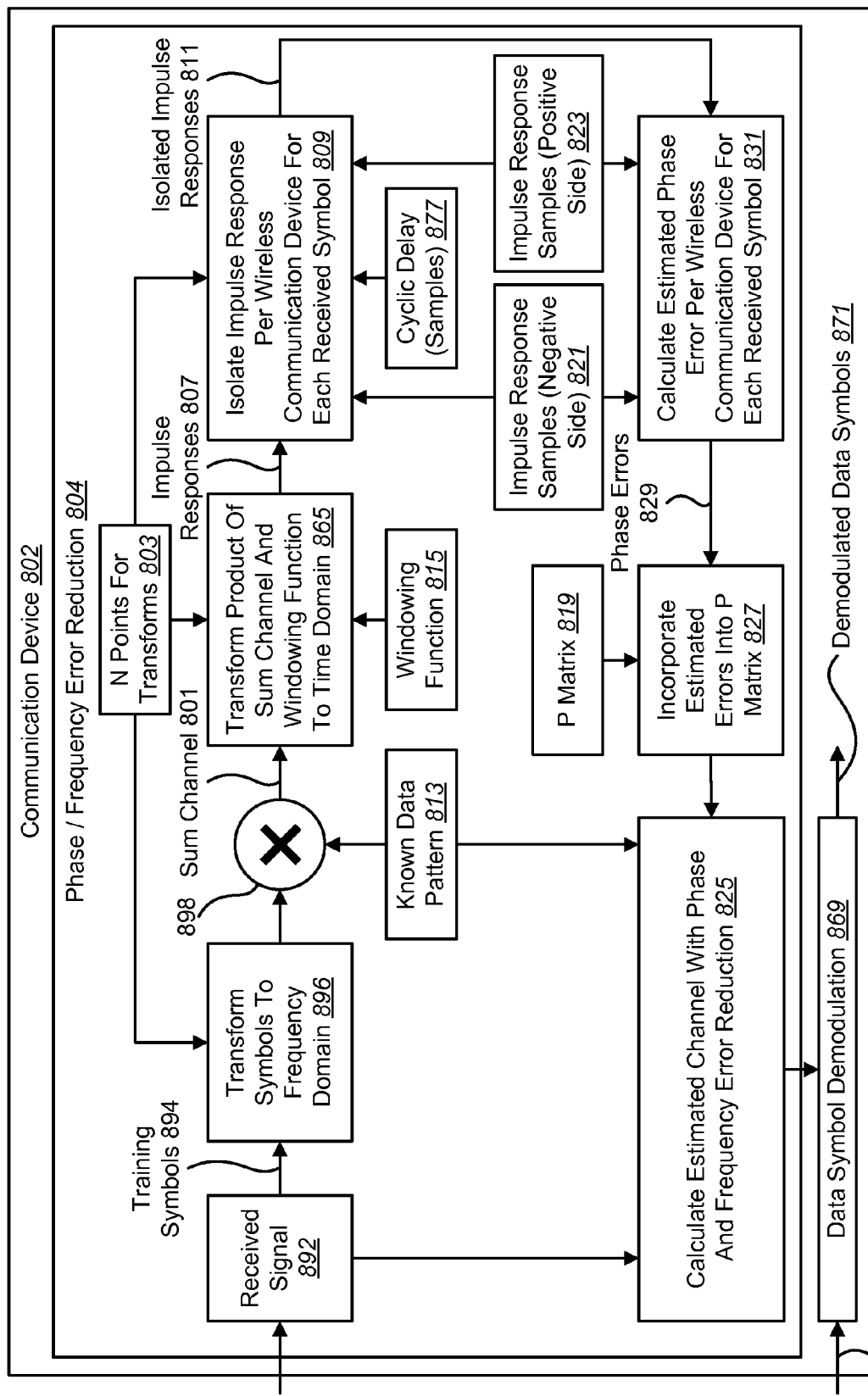
FIG. 8 is a block diagram illustrating one configuration of a communication device wherein systems and methods for reducing phase errors on a communication device may be implemented.

FIG. 8 is a block diagram illustrating one configuration of a communication device 802 wherein systems and methods for reducing phase errors on a communication device may be implemented. The communication device (e.g., access point) 802 includes a phase/frequency error reduction module 804. The phase/frequency error reduction module 804 may be implanted in software, hardware or a combination of both. Training symbols 894 may be extracted from the received signal 892. These training symbols 894 may be transformed into the frequency domain 896 (e.g., via an N-point 803 FFT) and multiplied 898 by a known data pattern 813 as illustrated in Equation (2). This operation yields the sum channel 801. The sum channel 801 may be multiplied by a windowing function 815, which product may then be transformed into the time domain 865 (e.g., via an N-point 803 IFFT as illustrated in Equation (3)). This computation yields impulse responses 807 for each received training symbol 894.

Using N points 803, a number of impulse response samples on the negative side 821, a number of impulse response samples on the positive side 823 and a cyclic delay (i.e., per wireless communication device 122) in samples 877, the communication device 802 may isolate the impulse response per wireless communication device (e.g., access terminal) 122 for each received symbol 809 (e.g., as illustrated in Equation (4)). This operation 809 yields isolated impulse responses 811, which (e.g., along with a number of impulse response samples from the negative 821 and positive 823 sides) are used to calculate the estimated phase error 829 per wireless communication device 122 for each received training symbol 831 (e.g., as illustrated in Equation (5)). The communication device 802 may incorporate the estimated phase errors 829 into the P matrix 827 (e.g., using the P matrix 819 as illustrated in Equation (6)). The received signal 892, the known data pattern 813 and the P matrix 819 with estimated phase errors are then used to calculate the estimated channel with phase and frequency error reduction 825 (e.g., as illustrated in Equation (7)). The estimated channel may then be used to demodulate 869 modulated data symbols 867 received by the communication device 802, thus yielding demodulated data symbols 871. Thus, for example, the phase and frequency error estimates from a preamble may be used to correct the channel estimates, thereby preventing a degradation in the channel estimates.

Figure 9:
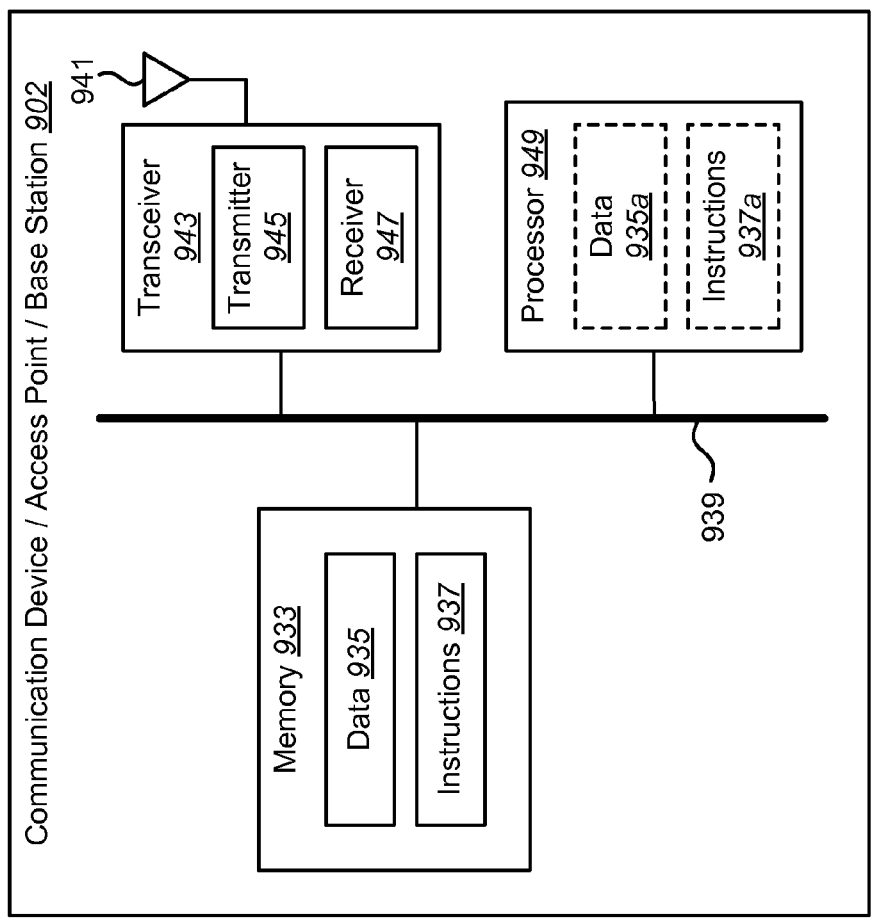
FIG. 9 illustrates certain components that may be included within a communication device, access point or base station.

FIG. 9 illustrates certain components that may be included within a communication device, access point or base station 902. The communication devices 102, 302, 802 discussed previously may be configured similarly to the communication device, access point or base station 902 shown in FIG. 9.

The communication device, access point or base station 902 includes a processor 949. The processor 949 may be a general purpose single- or multi-chip microprocessor (e.g., an ARM), a special purpose microprocessor (e.g., a digital signal processor (DSP)), a microcontroller, a programmable gate array, etc. The processor 949 may be referred to as a central processing unit (CPU). Although just a single processor 949 is shown in the communication device, access point or base station 902 of FIG. 9, in an alternative configuration, a combination of processors (e.g., an ARM and DSP) could be used.

The communication device, access point or base station 902 also includes memory 933 in electronic communication with the processor 949 (i.e., the processor 949 can read information from and/or write information to the memory 933). The memory 933 may be any electronic component capable of storing electronic information. The memory 933 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 935 and instructions 937 may be stored in the memory 933. The instructions 937 may include one or more programs, routines, sub-routines, functions, procedures, etc. The instructions 937 may include a single computer-readable statement or many computer-readable statements. The instructions 937 may be executable by the processor 949 to implement the methods 200, 500, 600 described above. Executing the instructions 937 may involve the use of the data 935 that is stored in the memory 933. FIG. 9 shows some instructions 937a and data 935a being loaded into the processor 949.

The communication device, access point or base station 902 may also include a transmitter 945 and a receiver 947 to allow transmission and reception of signals between the communication device, access point or base station 902 and a remote location (e.g., a wireless communication device 122). The transmitter 945 and receiver 947 may be collectively referred to as a transceiver 943. An antenna 941 may be electrically coupled to the transceiver 943. The communication device, access point or base station 902 may also include (not shown) multiple transmitters, multiple receivers, multiple transceivers and/or multiple antenna.

The various components of the communication device, access point or base station 902 may be coupled together by one or more buses, which may include a power bus, a control signal bus, a status signal bus, a data bus, etc. For simplicity, the various buses are illustrated in FIG. 9 as a bus system 939.

Figure 10:
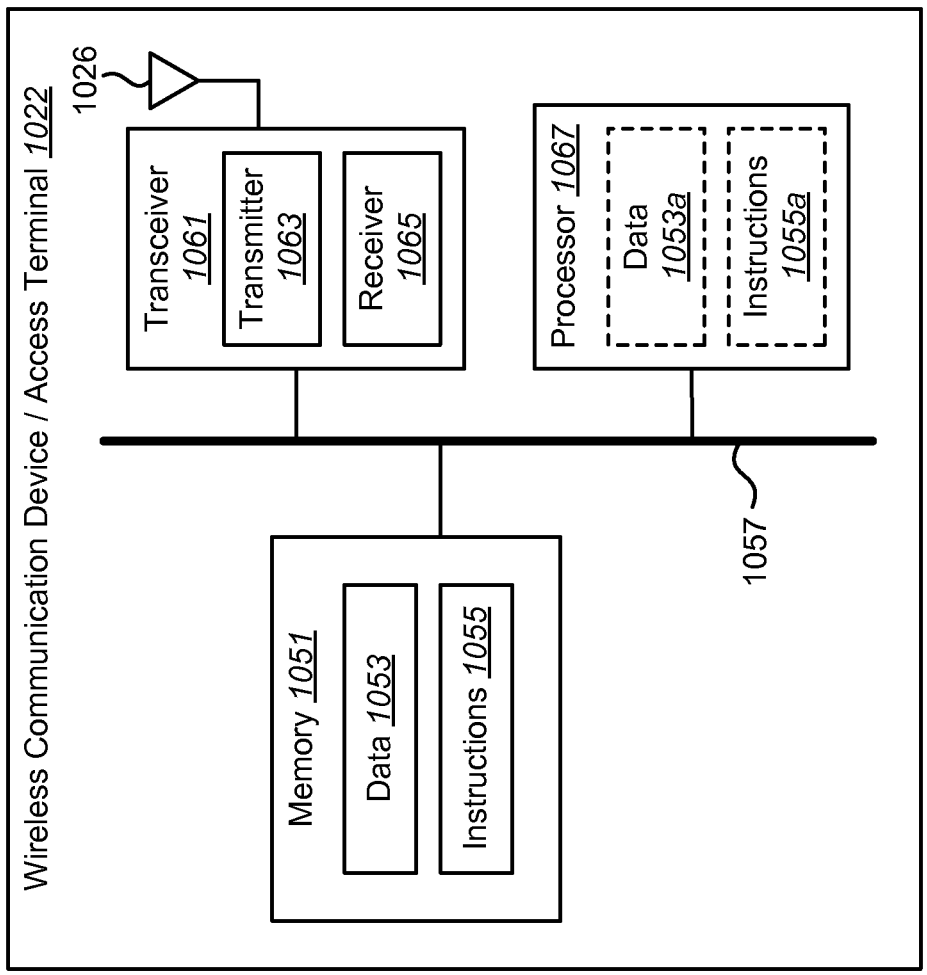
FIG. 10 illustrates certain components that may be included within a wireless communication device or access terminal.

FIG. 10 illustrates certain components that may be included within a wireless communication device or access terminal 1022. The wireless communication devices 122, 322 described above may be configured similarly to the wireless communication device or access terminal 1022 that is shown in FIG. 10.

The wireless communication device or access terminal 1022 includes a processor 1067. The processor 1067 may be a general purpose single- or multi-chip microprocessor (e.g., an ARM), a special purpose microprocessor (e.g., a digital signal processor (DSP)), a microcontroller, a programmable gate array, etc. The processor 1067 may be referred to as a central processing unit (CPU). Although just a single processor 1067 is shown in the wireless communication device or access terminal 1022 of FIG. 10, in an alternative configuration, a combination of processors (e.g., an ARM and DSP) could be used.

The wireless communication device or access terminal 1022 also includes memory 1051 in electronic communication with the processor 1067 (i.e., the processor 1067 can read information from and/or write information to the memory 1051). The memory 1051 may be any electronic component capable of storing electronic information. The memory 1051 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1053 and instructions 1055 may be stored in the memory 1051. The instructions 1055 may include one or more programs, routines, sub-routines, functions, procedures, etc. The instructions 1055 may include a single computer-readable statement or many computer-readable statements. Executing the instructions 1055 may involve the use of the data 1053 that is stored in the memory 1051. FIG. 10 shows some instructions 1055a and data 1053a being loaded into the processor 1067.

The wireless communication device or access terminal 1022 may also include a transmitter 1063 and a receiver 1065 to allow transmission and reception of signals between the wireless communication device or access terminal 1022 and a remote location (e.g., a communication device 102). The transmitter 1063 and receiver 1065 may be collectively referred to as a transceiver 1061. An antenna 1026 may be electrically coupled to the transceiver 1061. The wireless communication device or access terminal 1022 may also include (not shown) multiple transmitters, multiple receivers, multiple transceivers and/or multiple antenna.

The various components of the wireless communication device or access terminal 1022 may be coupled together by one or more buses, which may include a power bus, a control signal bus, a status signal bus, a data bus, etc. For simplicity, the various buses are illustrated in FIG. 10 as a bus system 1057.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A communication device that is configured for reducing phase errors, comprising:
   a processor;
   memory in electronic communication with the processor;
   instructions stored in the memory, the instructions being executable to:
   isolate an impulse response by separating the impulse response from a plurality of estimated impulse responses for each of a plurality of wireless communication devices;
   calculate a phase error for each wireless communication device by calculating an angle of a cross correlation of the isolated impulse response for the wireless communication device and an isolated impulse response for the wireless communication device of a first received symbol; and
   reduce the phase error for each wireless communication device based on the calculated error.

2. The communication device of claim 1, wherein the instructions are further executable to reduce a frequency error for each wireless communication device.

3. The communication device of claim 2, wherein the phase and frequency errors for each wireless communication device are derived by the communication device from phase differences between the isolated impulse response and at least one other of the plurality of impulse responses.

4. The communication device of claim 2, wherein reducing the phase and frequency errors for each wireless communication device is performed using a matrix multiplication.

5. The communication device of claim 1, wherein the communication device is an access point.

6. The communication device of claim 1, wherein the wireless communication device is an access terminal.

7. The communication device of claim 1, wherein the instructions are further executable to receive a plurality of training symbols from each wireless communication device.

8. The communication device of claim 1, wherein each wireless communication device uses at least one spatial stream, and wherein each wireless communication device uses a different cyclic delay per spatial stream.

9. The communication device of claim 8, wherein a cyclic delay difference between each wireless communication device is greater than an expected channel plus a filtering length.

10. The communication device of claim 8, wherein a cyclic delay difference is large enough to isolate the impulse response for each of the wireless communication devices.

11. The communication device of claim 10, wherein the cyclic delay difference is larger than 200 nanoseconds.

12. The communication device of claim 1, wherein the instructions are further executable to discover one or more wireless communication devices.

13. The communication device of claim 1, wherein the instructions are further executable to estimate a channel.

14. The communication device of claim 13, wherein the instructions are further executable to:
receive data symbols from the wireless communication devices; and
demodulate the data symbols using the estimated channel.

15. The communication device of claim 1, further comprising multiple antennas.

16. The communication device of claim 1, wherein the processor comprises a digital signal processor (DSP).

17. The communication device of claim 1, wherein the instructions are further executable to:
calculate a sum channel in the frequency domain for the plurality of wireless communication devices; and
estimate the plurality of impulse responses from the calculated sum channel.

18. A method for reducing phase errors on a communication device, comprising:
isolating, on the communication device, an impulse response by separating the impulse response from a plurality of estimated impulse responses for each of a plurality of wireless communication devices;
calculating, on the communication device, a phase error for each wireless communication device by calculating an angle of a cross correlation of the isolated impulse response for the wireless communication device and an isolated impulse response for the wireless communication device of a first received symbol; and
reducing, on the communication device, the phase error for each wireless communication device based on the calculated error.

19. The method of claim 18, further comprising reducing a frequency error for each wireless communication device.

20. The method of claim 19, wherein the phase and frequency errors for each wireless communication device are derived by the communication device from phase differences between the isolated impulse response and at least one other of the plurality of impulse responses.

21. The method of claim 19, wherein reducing the phase and frequency errors for each wireless communication device is performed using a matrix multiplication.

22. The method of claim 18, wherein the communication device is an access point.

23. The method of claim 18, wherein the wireless communication device is an access terminal.

24. The method of claim 18, further comprising receiving a plurality of training symbols from each wireless communication device.

25. The method of claim 18, wherein each wireless communication device uses at least one spatial stream, and wherein each wireless communication device uses a different cyclic delay per spatial stream.

26. The method of claim 25, wherein a cyclic delay difference between each wireless communication device is greater than an expected channel plus a filtering length.

27. The method of claim 25, wherein a cyclic delay difference is large enough to isolate the impulse response for each of the wireless communication devices.

28. The method of claim 27, wherein the cyclic delay difference is larger than 200 nanoseconds.

29. The method of claim 18, further comprising discovering one or more wireless communication devices.

30. The method of claim 18, further comprising estimating a channel.

31. The method of claim 30, further comprising:
receiving data symbols from the wireless communication devices; and
demodulating the data symbols using the estimated channel.

32. The method of claim 18, wherein the communication device uses multiple antennas.

33. The method of claim 18, wherein the communication device uses a digital signal processor (DSP).

34. The method of claim 18, further comprising:
calculating a sum channel in the frequency domain for the plurality of wireless communication devices; and
estimating, on the communication device, the plurality of impulse responses from the calculated sum channel.

35. An apparatus for reducing phase errors, comprising:
means for isolating an impulse response by separating the impulse response from a plurality of estimated impulse responses for each of a plurality of wireless communication devices;
means for calculating a phase error for each wireless communication device by calculating an angle of a cross correlation of the isolated impulse response for the wireless communication device and an isolated impulse response for the wireless communication device of a first received symbol; and
means for reducing the phase error for each wireless communication device based on the calculated error.

36. The apparatus of claim 35, further comprising means for reducing a frequency error for each wireless communication device.

37. The apparatus of claim 36, wherein the phase and frequency errors for each wireless communication device are derived by the communication device from phase differences between the isolated impulse response and at least one other of the plurality of impulse responses.

38. The apparatus of claim 36, wherein reducing the phase and frequency errors for each wireless communication device is performed using a matrix multiplication.

39. The apparatus of claim 35, wherein each wireless communication device uses at least one spatial stream, and wherein each wireless communication device uses a different cyclic delay per spatial stream.

40. The apparatus of claim 39, wherein a cyclic delay difference between each wireless communication device is greater than an expected channel plus a filtering length.

41. The apparatus of claim 39, wherein a cyclic delay difference is large enough to isolate the impulse response for each of the wireless communication devices.

42. The apparatus of claim 35, further comprising means for estimating a channel.

43. The apparatus of claim 42, further comprising:
means for receiving data symbols from the wireless communication devices; and
means for demodulating the data symbols using the estimated channel.

44. The apparatus of claim 35, further comprising:
means for calculating a sum channel in the frequency domain for the plurality of wireless communication devices; and
means for estimating the plurality of impulse responses from the calculated sum channel.

45. A method for reducing phase or frequency errors on a communication device, comprising:
receiving spatial streams with different cyclic delays from a plurality of wireless communication devices;
isolating an impulse response for each wireless communication device of the wireless communication devices based on the different cyclic delays by separating the impulse response from a plurality of impulse responses;
determining a phase error for each wireless communication device based on the isolated impulse response and the cyclic delay for the wireless communication device by calculating an angle of a cross correlation of the isolated impulse response for the wireless communication device and an isolated impulse response for the wireless communication device of a first received symbol; and
correcting at least one of phase errors or frequency errors for each wireless communication device based on the determined phase error for each wireless communication device.

46. The method of claim 45, wherein the correcting the at least one of the phase errors or the frequency errors comprises:
estimating a channel with at least one of a frequency error reduction or a phase error reduction for each wireless communication device; and
demodulating modulated data symbols from each wireless communication device based on the estimated channel for the wireless communication device.

47. The method of claim 45, further comprising:
calculating a sum channel of received symbols in the frequency domain; and
estimating the plurality of impulse responses from the sum channel.

48. The method of claim 45, wherein a difference of the cyclic delays is larger than 200 nanoseconds.

49. An apparatus for reducing phase or frequency errors, comprising:
a processor;
memory in electronic communication with the processor;
instructions stored in the memory, the instructions being executable to:
receive spatial streams with different cyclic delays from a plurality of wireless communication devices;
isolate an impulse response for each wireless communication device of the wireless communication devices based on the different cyclic delays by separating the impulse response from a plurality of impulse responses;
determine a phase error for each wireless communication device based on the isolated impulse response and the cyclic delay for the wireless communication device by calculating an angle of a cross correlation of the isolated impulse response for the wireless communication device and an isolated impulse response for the wireless communication device of a first received symbol; and
correct at least one of phase errors or frequency errors for each wireless communication device based on the determined phase error for each wireless communication device.

50. The apparatus of claim 49, wherein the instructions executable to correct the at least one of the phase errors or the frequency errors comprises instructions executable to:
estimate a channel with at least one of a frequency error reduction or a phase error reduction for each wireless communication device; and
demodulate modulated data symbols from each wireless communication device based on the estimated channel for the wireless communication device.

51. The apparatus of claim 49, wherein the instructions are further executable to:
calculate a sum channel of received symbols in the frequency domain; and
estimate the plurality of impulse responses from the sum channel.

52. The apparatus of claim 49, wherein a difference of the cyclic delays is larger than 200 nanoseconds.

* * * * *